US012620788B2

(12) United States Patent　(10) Patent No.:　US 12,620,788 B2
Dominguez Ebitsch et al.　(45) Date of Patent:　May 5, 2026

(54) SUBMARINE CABLE SYSTEM AND METHOD FOR LAYING A SUBMARINE CABLE SYSTEM

(71) Applicants: Stefan Dominguez Ebitsch, Hamburg (DE); Sebastian Obermeyer, Hamburg (DE)

(72) Inventors: Stefan Dominguez Ebitsch, Hamburg (DE); Sebastian Obermeyer, Hamburg (DE)

(73) Assignee: RWE Offshore Wind GmbH, Essen (DE)

( * ) Notice: Subject to any disclaimer, the term of this patent is extended or adjusted under 35 U.S.C. 154(b) by 0 days.

(21) Appl. No.: 18/658,137

(22) Filed: May 8, 2024

(65) Prior Publication Data

US 2024/0291251 A1　Aug. 29, 2024

Related U.S. Application Data

(63) Continuation of application No. PCT/EP2022/081758, filed on Nov. 14, 2022.

(30) Foreign Application Priority Data

Nov. 30, 2021　(DE) ..................... 10 2021 131 422.4

(51) Int. Cl.
　　*H02G 1/10*　　　(2006.01)
　　*H02G 15/14*　　(2006.01)
(52) U.S. Cl.
　　CPC .............. *H02G 1/10* (2013.01); *H02G 15/14* (2013.01)
(58) Field of Classification Search
　　CPC ................................... H02G 1/10; H02G 9/02
　　See application file for complete search history.

(56) References Cited

U.S. PATENT DOCUMENTS

| | | | |
|---|---|---|---|
| 7,614,894 B2 | 11/2009 | Mæland et al. | |
| 9,368,257 B2 | 6/2016 | Karlsen et al. | |
| | (Continued) | | |

FOREIGN PATENT DOCUMENTS

| | | |
|---|---|---|
| CN | 111477393 A | 7/2020 |
| CN | 111899927 A | 11/2020 |
| | (Continued) | |

OTHER PUBLICATIONS

Resner Leszek et al: "Radial Water Barrier in Submarine Cables, Current Solutions and Innovative Development Directions", Energies, Bd. 14, Nr. 10, 12. May 2021 (May 12, 2021), Seite 2761, XP055958440, DOI: 10.3390/en14102761.

*Primary Examiner* — Chau N Nguyen
(74) *Attorney, Agent, or Firm* — Reinhart Boerner Van Deuren P.C.

(57)　　　　　ABSTRACT

A submarine cable system includes a submarine cable with two energy lines between two distal ends. An energy line includes a stranded wire and an insulation layer surrounding the stranded wire. The two energy lines are guided in a common metallic reinforcement surrounded by an outer insulation layer. A first section of the submarine cable is formed starting from a first of the distal ends of the submarine cable to a transition region. A second section is formed starting from the transition region to a second of the distal ends of the submarine cable. A sleeve-shaped transition piece has through opening with the transition region disposed within the through opening. A cable duct has an opening formed to receive the transition piece such that an outer shell surface of the transition piece abuts an inner shell surface of the cable duct in the region of the opening.

13 Claims, 8 Drawing Sheets

(56) References Cited

U.S. PATENT DOCUMENTS

| | | | |
|---|---|---|---|
| 9,595,367 B2 | 3/2017 | Maritano et al. | |
| 2003/0026662 A1 | 2/2003 | Vidal et al. | |
| 2013/0233604 A1 | 9/2013 | Perego | |
| 2018/0375223 A1 | 12/2018 | Nielsen et al. | |
| 2019/0086624 A1 | 3/2019 | Schneider et al. | |
| 2019/0214801 A1 | 7/2019 | Smith et al. | |
| 2021/0320487 A1* | 10/2021 | Soerensen | H02G 1/10 |
| 2023/0110151 A1* | 4/2023 | Meinen | F03D 80/85 |
| | | | 174/79 |

FOREIGN PATENT DOCUMENTS

| | | | |
|---|---|---|---|
| CN | 113299431 A | | 8/2021 |
| DE | 893358 C | | 10/1953 |
| EP | 2382639 B1 | | 2/2017 |
| EP | 3333995 A1 | | 6/2018 |
| GB | 2337366 A | | 11/1999 |
| JP | H09129031 A | | 5/1997 |
| JP | 2016116266 A | | 6/2016 |
| KR | 20110102296 A | | 9/2011 |
| KR | 101467113 B1 | | 12/2014 |
| WO | WO 2019/184101 | * | 10/2019 |

* cited by examiner

SUBMARINE CABLE SYSTEM AND METHOD FOR LAYING A SUBMARINE CABLE SYSTEM

CROSS-REFERENCE TO RELATED PATENT APPLICATIONS

This patent application is a continuation of International Application No. PCT/EP2022/081758, filed on Nov. 14, 2022, which claims the benefit of priority to German Patent Application No. 10 2021 131 422.4, filed Nov. 30, 2021, the entire teachings and disclosures of both applications are incorporated herein by reference thereto.

FIELD OF THE INVENTION

The subject matter relates to a submarine cable system and a method for laying such a submarine cable system.

BACKGROUND OF THE INVENTION

Due to the increasing expansion of electrical power generation on the high seas (offshore), electrical submarine cables are also increasingly being laid between an offshore plant and an onshore plant. Usually, several generation plants, for example wind turbines, are connected offshore to a transformer station, also called a sub-station. Starting from this sub-station, the electrical energy generated by the generation plants is transmitted via an electrical submarine cable to an onshore plant. Via the onshore plant, the electrical energy is fed into the electrical grid.

On the one hand, submarine cables must be able to transport high electrical power. Therefore, they must have a large current carrying capacity. This leads to considerable conductor cross-sections in the electrical energy lines. Furthermore, the submarine cables are subjected to high mechanical loads, so that appropriate mechanical protection must be provided. This can be mechanical protection against tensile, shear, bending, torsional or other forces. Such protection is usually provided by metallic reinforcement. One or more reinforcement layers may be provided in a submarine cable for this purpose. In addition, submarine cables are usually exposed to salt water, which is highly corrosive. The strands of the energy lines must also be protected against this, so various insulation layers are provided to prevent the ingress of seawater or the diffusion of seawater as completely as possible.

These two requirements for both mechanical stability and stability against environmental influences run counter to the need to carry high electrical power in the submarine cable. On the one hand, the high electrical powers cause the strands to heat up due to ohmic losses. These ohmic losses are minimized as far as possible by selecting the cable cross-section as large as possible and by using a metal with a high conductivity value, such as aluminum, copper or a copper alloy. On the other hand, however, when the submarine cable is used as an AC line, induced currents occur within the reinforcement due to the metallic reinforcement. These induced eddy currents also generate ohmic losses in the reinforcement. Both lead to thermal losses and, consequently, heating of the cable.

The thermal losses along the submarine cable are usually well dissipated by the surrounding water and/or the seabed, so that sufficient heat dissipation of the submarine cable is provided, even when very high electrical powers are transmitted.

As mentioned above, the submarine cable is routed to an onshore installation (station). For this purpose, the submarine cable is nowadays transferred to an underground cable duct near the coast at a transition point. Such a cable duct, often designed as HDD (Horizontal Directional Drilling) Duct, runs underground from the transition point of the submarine cable to the onshore facility or Transition Joint Bay (TJB), where the transition to the onshore cable takes place. The cable duct is often empty (the cable is surrounded by air), but can be filled with fill material, usually grout or another fill material, preferably mineral, to improve the thermal conductivity of the cable. The plastic tube results in additional thermal insulation of the submarine cable.

The lack of water and the harsher conditions (cables installed very deep, possibly surrounded by air in plastic pipes) results in the submarine cable not being cooled as well as it would be if it were installed underwater or in the seabed. Overall, this type of installation onshore results in the maximum power that can be transmitted by the submarine cables being limited compared to installing the submarine cables exclusively underwater/in the seabed. To compensate for these disadvantages, nowadays either electrical power transmitted via the submarine cable has to be throttled or the cable cross-sections have to be significantly increased. Both result in considerable additional costs.

SUMMARY OF THE INVENTION

The subject matter was based on the object of increasing the maximum current carrying capacity of a laid submarine cable.

This object is solved by a submarine cable system and a method according to the claims listed below.

A submarine cable according to the subject matter has two distal ends. At least two energy lines extend between these two distal ends. Preferably, however, more than two, in particular three, four or five energy lines may be routed within a submarine cable according to the subject matter. The energy lines serve to transport electrical energy. Preferably, the energy lines are operated as alternating current lines. In this case, the present solution is particularly advantageous due to lower eddy current losses. Nevertheless, the present solution can also be used for direct current lines. For the transmission of electrical energy, each of the energy lines has a stranded wire. A strand can be a multifilament strand or a solid material strand. Preferably, a multifilament strand is formed from many filaments (wires/strands) that are preferably stranded or twisted. Each strand of each of the energy lines is surrounded by an insulation layer.

An insulation layer may thereby be formed of one material or of a laminate of different materials and/or layers. In particular, the insulation layers may be extruded onto the strands. Insulation layers can also be wound around the strands.

Through the insulation layers, the strands of the respective energy lines are insulated from each other. The dielectric strength is at least 1000 V, preferably more than 1000 V.

The at least two energy lines can each be guided individually, but objectively at least jointly in a metallic reinforcement. The metallic reinforcement can be single or multilayer and is preferably formed by metallic wires. The metallic wires of the respective reinforcement layers can be guided in synchronous lay or in counter lay to each other. Initially, the insulation layers of the individual energy lines can be guided in a common insulation layer. This can then be surrounded by the metallic reinforcement. Finally, the metallic reinforcement is surrounded by at least one further, outer insulation layer. Both the inner and outer insulation layers may be multilayer, laminated, multilayer and/or the like. The materials of the insulation layers may be the same or different from each other.

A submarine cable is typically laid from an offshore station to an onshore station or transition joint bay (TJB). Here, a first distal end of the submarine cable is mechanically and in particular also electrically connected in the offshore station and the second distal end of the submarine cable is mechanically and in particular also electrically connected in the onshore station or transition joint bay (TJB).

The submarine cable according to the subject matter is characterized by two sections. In both sections, the energy lines run, and in particular, there is no interruption of the energy line between the distal ends. This means that the submarine cable, in particular the energy line of the submarine cable are routed without interruption between the offshore station and the onshore station or Transition Joint Bay (TJB). A first section of the submarine cable is formed starting from a first of the distal ends of the submarine cable to a transition region. A second portion of the submarine cable is formed extending from the transition region to a second of the distal ends of the submarine cable. Thus, transition region forms the transition between the two sections of the submarine cable.

In the first section of the submarine cable, the energy lines are guided in the metallic reinforcement and the outer insulation layer surrounding the metallic reinforcement. In particular, the submarine cable in the first section is formed like a conventional submarine cable, i.e. with all insulation and reinforcement layers, as this is conventionally realized.

Starting from the first section, the energy lines preferably extend uninterruptedly over the transition region into the second section.

In the second section, the energy lines are free of the metallic reinforcement and the outer insulation layer surrounding the metallic reinforcement. This results in no thermal losses due to eddy currents in the reinforcement in the second section. Furthermore, thermal convection at the energy lines is increased compared to thermal convection in the first section due to the removed outer insulation.

Here, the second section is the section of the submarine cable that is routed onshore, whereas the first section of the cable is the section of the submarine cable that is routed underwater/in the seabed, offshore. At the transition section, the submarine cable is provided with a sleeve-shaped transition piece. This transition piece has a through opening. Preferably, the transition region is arranged within the through opening.

According to an embodiment, it is possible that the submarine cable is manufactured onshore and preferably also already onshore the transition piece is joined to the submarine cable, so that the first section, and in particular transition region is located within the through opening. According to a further embodiment, however, it is also possible that the submarine cable is manufactured onshore without a transition piece and is only joined with the transition piece offshore.

According to an embodiment, the transition piece is preferably at least divided into two parts, wherein a first section is preferably formed as a one-piece sleeve with a passage. In the passage of the sleeve, the first section of the submarine cable with the outer insulation may be guided. This first sleeve may terminate in a second section of the transition piece. The second section may be formed as a multi-part sleeve with a number of passages corresponding to the number of energy lines of the submarine cable. The energy lines may be guided with their respective insulation layer into the respective passage of the multi-part sleeve.

The passages of the two sleeves preferably have inner lateral surfaces, in particular made of a plastic. In particular, the passages have a diameter that is formed in an interference fit with the outer diameter, on the one hand, of the outer insulation layer and, on the other hand, of the insulation layer surrounding the strands. Preferably, the inner lateral surfaces of the passages are formed of the same or a similar plastic as the respective insulation layer which abuts the inner lateral surface of the passage of the sleeve.

The transition piece is used to mechanically connect the submarine cable starting from offshore laying to laying in an underground cable duct. In this context, the transition piece is preferably inserted into the cable duct together with the submarine cable or is connected to the cable duct, in particular screwed.

According to an embodiment, it is proposed that the submarine cable system comprises a cable duct. The cable duct has an opening for receiving the transition piece. The transition piece is thereby preferably inserted or pushed into the opening of the cable duct in such a way that an outer lateral surface of the transition piece rests against an inner lateral surface of the cable duct in the region of the opening. The transition piece is preferably inserted into the opening of the cable duct in the form of a plug. Also, the transition piece may be arranged in a flange-like manner at the opening of the cable duct. In this regard, the sleeve of the transition piece receiving the first section of the cable may preferably lie at least partially outside the cable duct and/or the sleeves of the transition piece receiving the second section of the cable may preferably lie at least partially inside the cable duct.

The submarine cable may be inserted into the transition piece with the first section in a first sleeve. This first sleeve may have a flange-like projection on an end face thereof. The reinforcement may be placed on the end face of the flange-like projection. In this case, the wires of the reinforcement are preferably bent radially outwards in a fanned-out manner so that they can rest on the end face of the flange.

The end face of the flange or the end face of the sleeve on which the reinforcement is laid can be mechanically connected to a flange-like radial projection at the opening of the cable duct in such a way that the reinforcement is clamped between the two flanges.

It is also possible that the sleeve of the second section of the transition piece is screwed onto the face of the flange of the first section on which the reinforcement rests, so that the reinforcement is then clamped between the flange-like faces of the two parts. Thus, it is preferred that the reinforcement in the transition piece is clamped between two flange-like radial projections. The reinforcement may be grounded.

According to one embodiment, it is proposed that the first section of the submarine cable is inserted into the through opening in a watertight manner. For this purpose, the outer insulation of the submarine cable may abut against the inner lateral surface of a first sleeve of the transition piece. The first sleeve forms the through opening in the region of the first section of the submarine cable. The submarine cable is joined, in particular pushed, into this through opening until preferably the transition region.

According to an embodiment, it is proposed that the second section of the submarine cable is led out of the through-opening in a watertight manner. For this purpose, a second sleeve may be provided on the second portion of the transition piece. This may have a plurality of passages, each of which encloses one of the energy lines. Here, too, the outer surface of the insulation layer surrounding the respective strands can be in contact with the inner surface of the respective passage of the second sleeve.

The transition piece can abut with its flange-like radial projection against the flange-like radial projection of the cable duct. A radially projecting flange may be formed on an end face of the cable duct, which flange is formed as a stop for the transition piece. A sealing means, in particular a plastic seal, can be arranged between the two flange-like projections.

The transition piece can be formed in two parts, as already mentioned. The two parts can be formed in a sleeve-like manner. The two parts can each have a flange-like projection on one end face. These flange-like projections may be geometrically congruent with each other and may be attached to each other when connected. The reinforcement can be fixed in a clamping manner between the two flanges of the two parts of the transition piece. For this purpose, the reinforcement can be fanned out radially and placed between the two projections. The two parts can then be joined together, in particular screwed together, so that the reinforcement is fixed between the surfaces of the flanges that lie against each other. Also, a gasket, in particular a plastic gasket, can be arranged between the two flanges of the two parts that are in contact with each other.

The two parts may be sleeve-like, as mentioned above. A first part may be a first sleeve with a passage in which the submarine cable with the outer insulation is received. The second part may be a second sleeve having a number of passages corresponding to the number of energy lines of the submarine cable. In particular, the second sleeve can also be formed from two individual parts that are joined together along axially extending joining surfaces. It is then no longer necessary to thread the respective energy lines into the bushings of the sleeve. The energy lines may be accommodated in the passages of the second sleeve.

The passage of the first part may extend towards the first section of the submarine cable. The passageways of the second part may extend toward the second section of the submarine cable. In the assembled state, the first section of the submarine cable is guided in the first part. In the assembled state, the second section of the submarine cable is preferably guided in the second part. In the assembled state, the submarine cable protrudes from the second part with its second section.

The two parts of the transition piece, in particular the sleeves, have passages into which the energy lines and the submarine cable are inserted. The sleeves can be one-piece or multi-piece joints.

The transition piece should be sealed with respect to the cable duct. For this reason, it is proposed that an outer lateral surface of the transition piece is positively attached to an inner lateral surface of the cable duct. In particular, radial projections, which may be axially spaced from one another, may be arranged on the outer lateral surface of the transition piece. These radial projections can project radially outwards in a lip-shaped manner. The radial projections may bear against the inner lateral surface of the cable duct. It is particularly preferred if radial recesses are arranged corresponding to the radial projections on the outer lateral surface of the transition piece on the inner lateral surface of the cable duct. The transition piece is thus positively fixed to the inner lateral surface of the cable duct. The radial projections can optimize a sealing effect against water ingress from the interface between the transition piece and the cable duct.

As already explained, the reinforcement is fanned out in the region of the transition by bending the individual wires of the reinforcement radially outwards. The fanned-out reinforcement can preferably be located circumferentially around the energy lines. The reinforcement can be bent radially outward in a star shape. The transition piece can clamp the reinforcement. For this purpose, the reinforcement can either be clamped between the parts of the transition piece or it is also possible for the reinforcement to be clamped between a flange-like projection of the transition piece and a flange of the cable duct.

In addition to the frictional connection by clamping, a positive connection can also be made. For this purpose, a corresponding profiling can be provided on the end face where the reinforcement is fanned outwards. The end face of a flange can be provided with grooves which extend radially outwards and into which the wires of the reinforcement can be inserted. Preferably, these grooves can be formed on the surfaces of the flanges to be joined in correspondence with each other.

According to an embodiment, it is proposed that the submarine cable is guided with its first section starting from an offshore station to the transition piece and that the transition piece is guided into the cable duct. The submarine cable is thereafter routed with its second section within the cable duct underground to an onshore station or transition joint bay (TJB). The submarine cable is thus routed onshore as well as offshore, with uninterrupted energy lines. The submarine cable is cooled offshore using the water surrounding the cable. Because the reinforcement and the outer insulation are removed in the second section, there are fewer thermal losses in the cable duct due to the eddy currents that no longer occur in the reinforcement that has been removed there, and on the other hand the energy lines can be cooled more effectively because the outer insulation layer no longer hinders the assembly.

The cable duct is at least partly a horizontal drilling duct, in particular a horizontal directional drilling duct (HDD duct). To secure the submarine cable within the cable duct, spacers can be provided on the inner walls of the cable duct to keep the energy lines at a distance from the inner wall of the cable duct. This ensures that the energy lines within the cable duct do not rest against the wall of the cable duct.

In particular, a triangular routing of the energy lines within the cable duct is preferred.

In another aspect, a method for laying a corresponding submarine cable system is provided. Here, the submarine cable is assembled onshore with the two sections. In the fabrication of the submarine cable, a first section may be fabricated with both the reinforcement and the outer insulation, whereas a second section is fabricated without the reinforcement and outer insulation. The energy lines run uninterrupted between the two sections.

The cable made up in this way is connected offshore to an offshore station. This involves both an electrical and a mechanical connection. The mechanical connection is made in particular in the form of a so-called cable hang-off, in which the reinforcement of the cable is fixed to the offshore station with a force fit and/or a form fit.

The transition region is formed between the two sections of the submarine cable. The submarine cable is joined with the transition region in the through hole of the transition piece. This process can be done onshore during the harnessing process or offshore during the laying process. On a laying vessel, the submarine cable can be laid up to the transition point with the first section. Then, before the submarine cable is pulled into the cable duct, the transition piece can be attached to the submarine cable.

For onshore installation, the submarine cable with the second section is routed starting from the transition piece at least partially through the buried cable duct to an onshore station or Transition Joint Bay (TJB). At the onshore station/TJB, the submarine cable is electrically contacted, particularly the energy lines, so that electrical contact is made between the onshore station/TJB and the offshore station through the energy lines.

The transition piece can be made up onshore and attached to the submarine cable. For this purpose, the submarine cable may be joined with its transition region in the through hole of the transition piece. The reinforcement of the submarine cable can be bent outward in a fan-like manner, as described, and mechanically fixed to the transition piece. This can be done by the flanges of the two parts of the transition piece.

BRIEF DESCRIPTION OF THE DRAWINGS

The subject matter is explained in more detail below with reference to a drawing showing embodiments. In the drawing show.

DETAILED DESCRIPTION OF THE INVENTION

Figure 1:
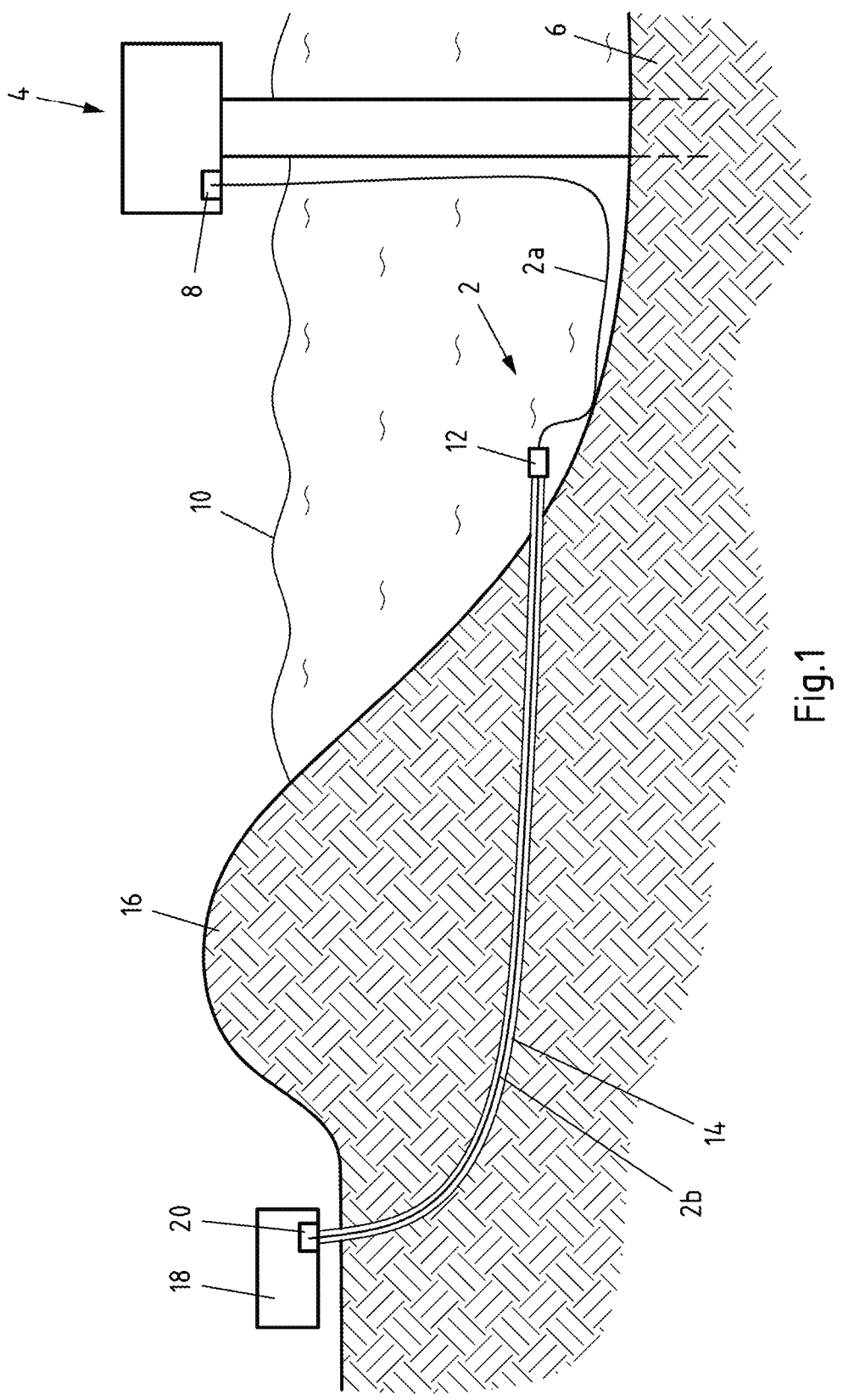
FIG. 1 shows a laid submarine cable system according to an embodiment.

FIG. 1 shows the laying of a submarine cable system. In FIG. 1, an offshore station 4, for example a substation 4, is shown. The substation 4 is floating or founded in the seabed. In the region of an electrical connection bracket 8, an electrical as well as mechanical contacting of the submarine cable 2 takes place in a conventional manner. The submarine cable 2 is guided with a first section 2a below the water surface 10 or in the seabed 6 to a transfer point 12. The transfer point 12 represents a transition of the submarine/subterranean laying of the submarine cable 2 to in a subterranean in HDD laying of the submarine cable 2.

Starting from the transfer point 12, a cable duct 14, for example an HDD duct, is guided. This cable duct 14 is guided, for example, under a dune 16. The cable duct 14 leads to an onshore station or transition joint bay (TJB) 18. The onshore station/TJB 18 is, for example, a transfer point for an electrical feed into an electrical energy network. Here, too, an electrical connection of the energy lines of the submarine cable 2 is made at a connection bracket 20. The laying of the submarine cable 2, in particular the connections at the connection brackets 8, 20, is sufficiently known.

According to the subject matter, it is now proposed to divide the submarine cable 2 into a first section 2a, which is routed subsea/underground, and a second section 2b, which is routed underground. The first section 2a has reinforcement and outer insulation whereas the second section is free of the reinforcement and especially the outer insulation.

Figure 2:
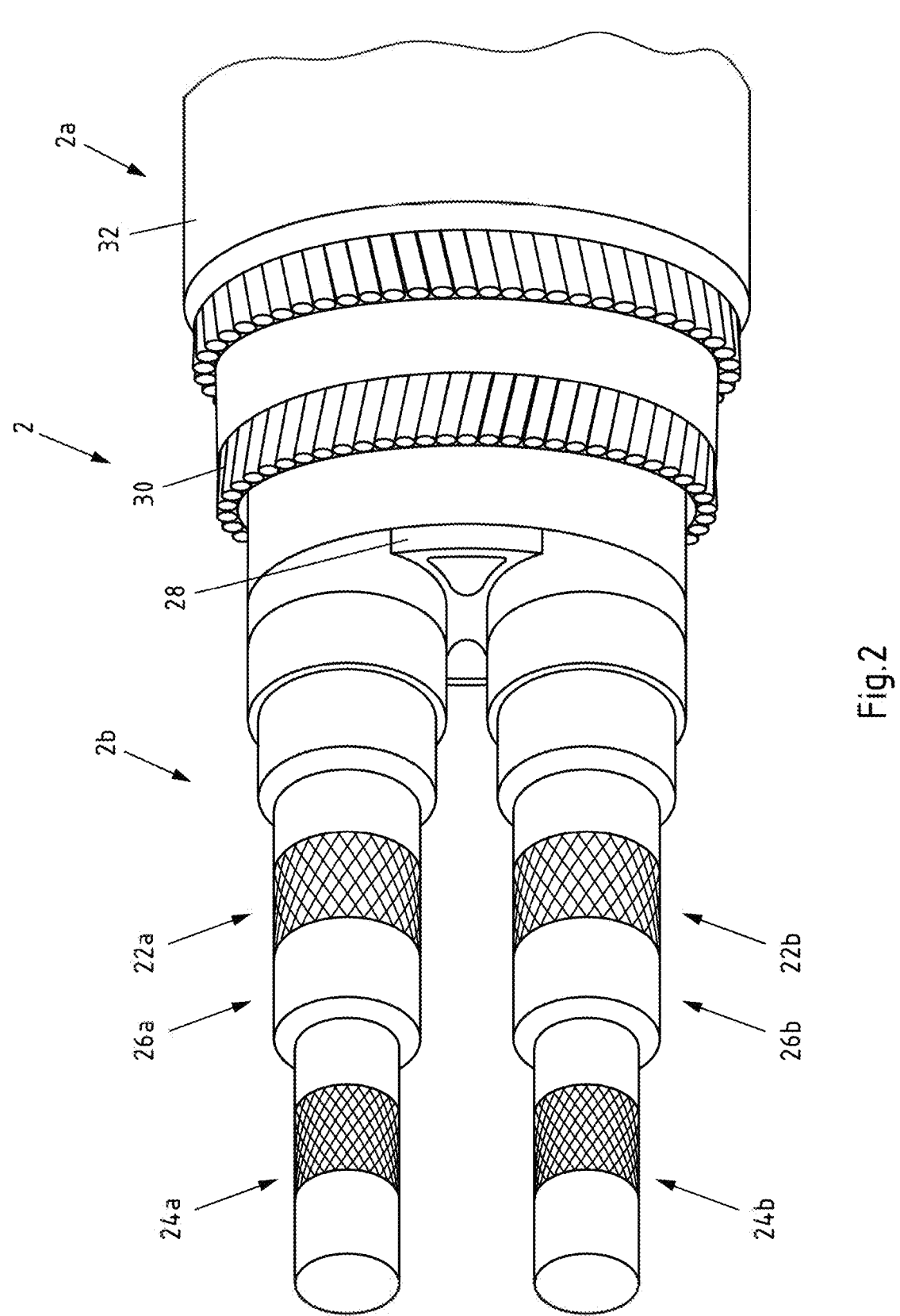
FIG. 2 shows an illustration of a submarine cable with two energy lines.

A transition section of a submarine cable 2 is exemplified in FIG. 2. The submarine cable 2 is formed of at least two energy lines 22a, b. The strands 24a, b of the energy lines 22a, b are formed of multifilaments, in particular twisted or stranded. A single or a laminated insulation layer 26a, b may be formed around the strands 24a, b. The structure of the insulation layer 26a, b or the insulation layers 26a, b is sufficiently known and will not be explained in detail.

Within the submarine cable 2, the energy lines 22a, b are preferably spaced apart by a spacer 28.

The energy lines 22a, b are surrounded by an at least single-layer, but preferably also multi-layer reinforcement 30. The reinforcement 30 is formed of metallic wires. The metallic wires are thereby preferably coiled or wound around the energy lines 22a, b. In the case of a multi-layer reinforcement 30, the wires may be wound in a counter-winding fashion. If multiple layers of reinforcement 30 are provided, they may each be insulated from one another. Finally, the submarine cable 2 is provided with an outer insulation 32.

In FIG. 2, the transition section is shown. On the right side the first section 2a is shown and on the left side the second section 2b is shown. The cable 2 is stripped of the insulation 32 and the reinforcement 30 in the transition region. The spacer 28 may also be removed. In the second section 2b, the cable 2 extends only with its energy lines 22a, b formed by the strands 24a, b and the single- or multi-layer insulation layer 26a, b.

Figure 3A:
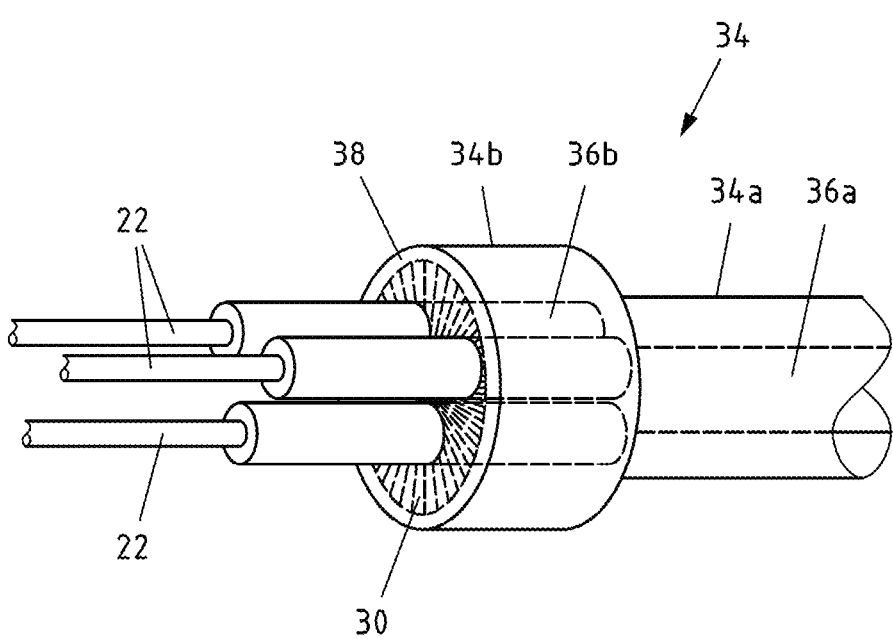
FIG. 3a-c show a transition piece according to a first embodiment.
Figure 3B:
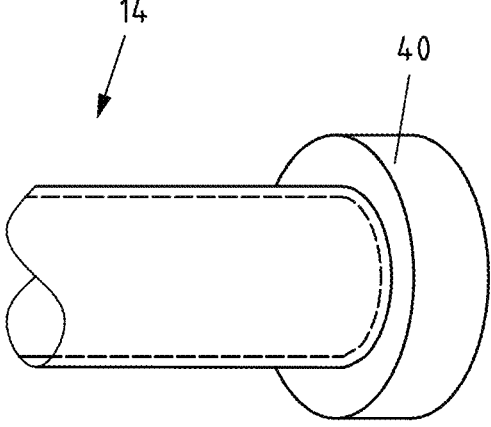
Figure 3C:
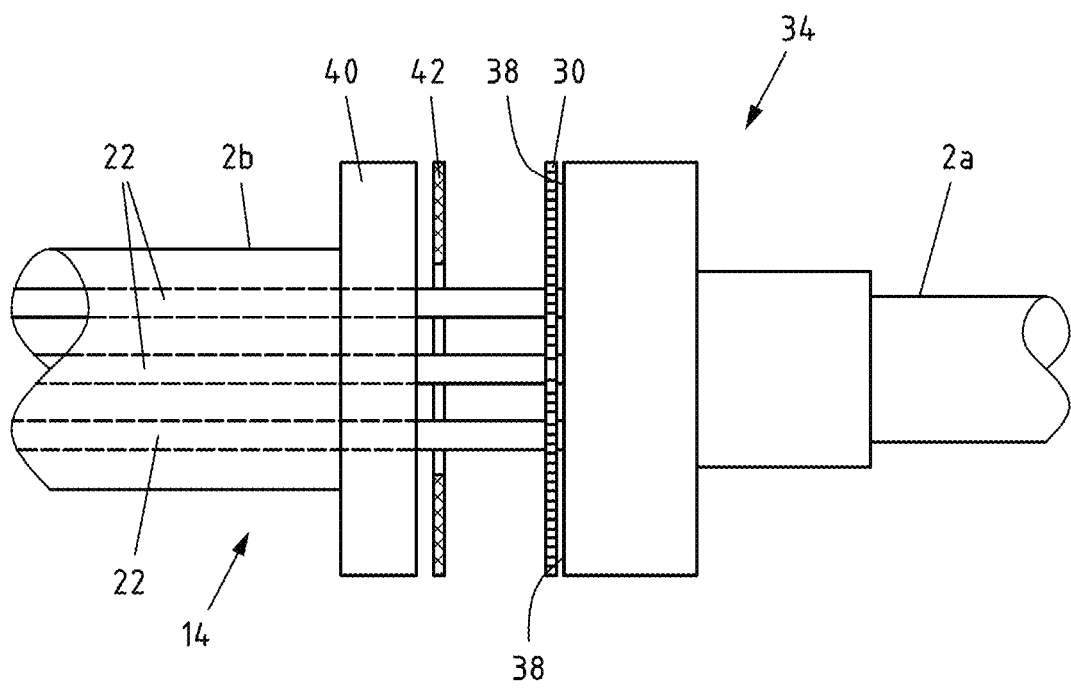
Figure 3C:
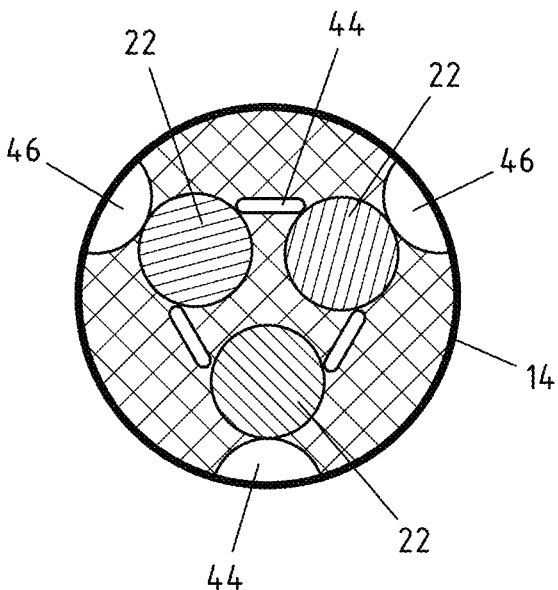

A transition piece 34 is shown by way of example in FIGS. 3a-c as well as 4a-c.

FIG. 3a shows a sleeve-shaped transition piece 34, which may be formed of a first part 34a and a second part 34b. The parts 34a, b may be one-piece or multi-piece. The transition piece 34 may be formed in one piece from the parts 34a, b or in multiple pieces from at least the parts 34a, b. The first part 34a is formed to receive the submarine cable 2 with the first section 2a. For this purpose, the first part 34a is formed in a sleeve-like manner and has a through opening 36a. In this through opening 36a, the cable 2 with its insulation layer 32 can be mounted, in particular pushed in or plugged in. The insulation 32 is in contact with the inner lateral surface of the through opening 36a.

In the region of the transition, the second part 34b adjoins the first part 34a. The second part 34b has a number of through openings 36b corresponding to the number of energy lines 22a, b. The second part 34b may also be sleeve-shaped. The respective energy lines 24a, b rest with their respective insulating layer 26a, b against the inner lateral surfaces of the through-openings 36b. The second part 34b is flange-shaped at its end face 38. At this end face 38, the reinforcement 30 is bent radially outward in a fan-like manner. The reinforcement 30 rests on the end face 38.

FIG. 3b schematically shows the cable duct 14, which has a flange 40 on its end face. This flange 40 is formed to receive the end face 38. In particular, a screw connection can be made.

FIG. 3c shows how the transition piece 34 can be connected to the cable duct 14. The transition piece 34 is screwed with its end face 38 against the flange 40 or fixed in some other way. The reinforcement 30 is clamped between the end face 38 and the flange 40. In addition, a gasket 42 may be provided. The cable 2 is inserted with its first section 2a into the transition piece 34. The transition piece 34 is screwed to the cable channel 14 at the flange 40. Inside the cable duct 14, the cable runs with its second section 2b, in particular the individual energy lines 22.

One or more spacers may be provided on the inner wall of the cable duct 14 so that the individual energy lines 22 are spaced from the inner wall of the cable duct 14.

Figure 4A:
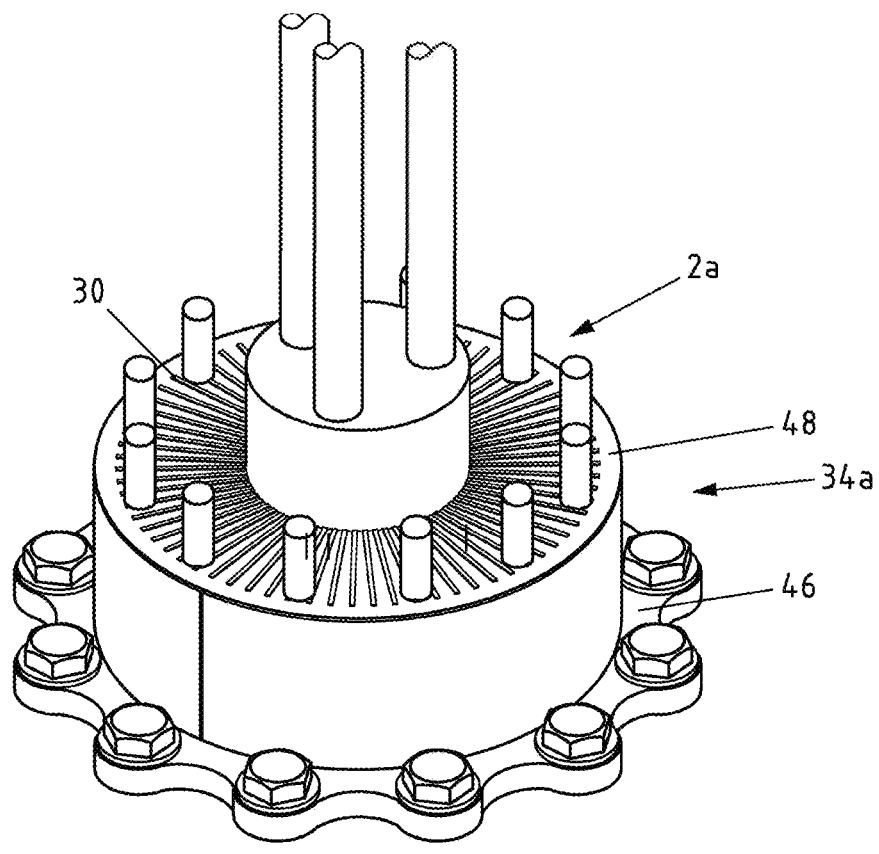
FIG. 4a-d show a transition piece according to a second embodiment.
Figure 4B:
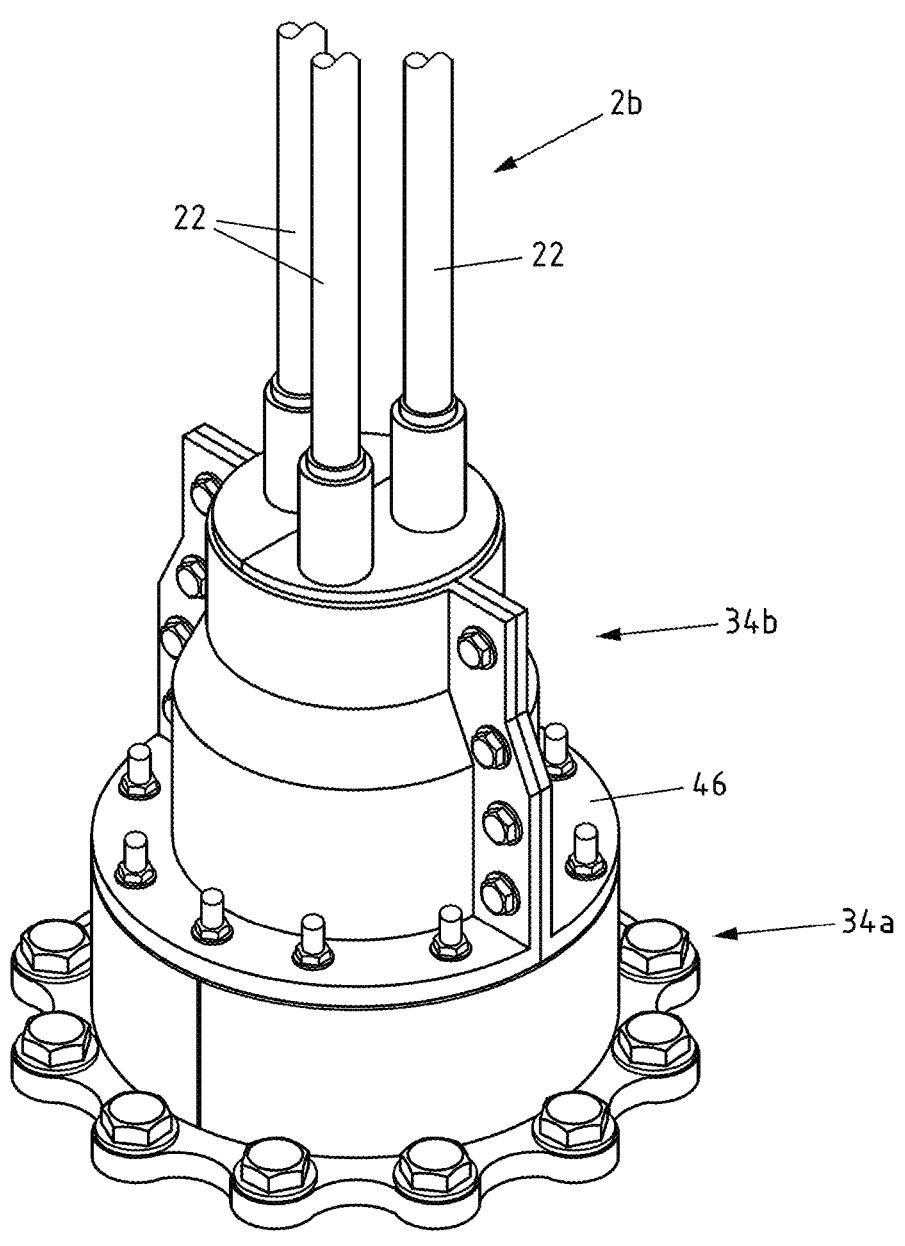

FIGS. 4a-d show another way in which a transition piece 34 may be formed. FIG. 4a shows a view of a first part 34a. The first part 34a has a flange 46. The first part 34a is formed in a sleeve shape and receives the cable 2 with its first section 2a. At an end face 48, the reinforcement 30 may be laid outwardly in a fan shape. A second part 34b can be placed on this first part 34a formed in this way, as shown in FIG. 4b. In this case, the second part 34b is in two pieces and can be placed in a sleeve-like manner around the energy lines 22 in the region 2b.

The second part 34b is screwed with a flange 46 against the end face 48 of the first part 34a. Here, the reinforcement 30 is clamped between the two parts 34a, 34b. A seal 42 may also be provided on the end face 48.

Figure 4C:
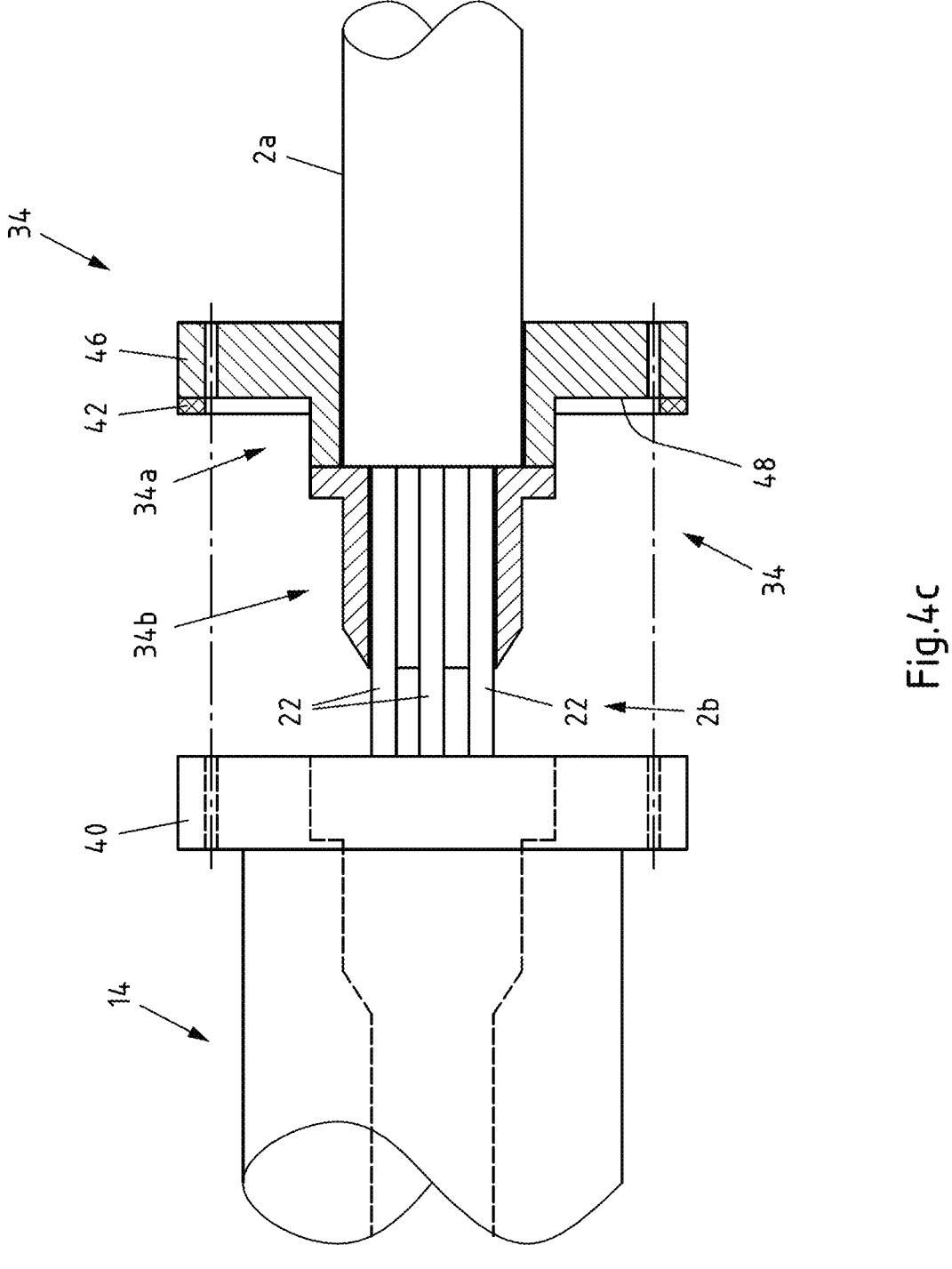
Figure 4D:
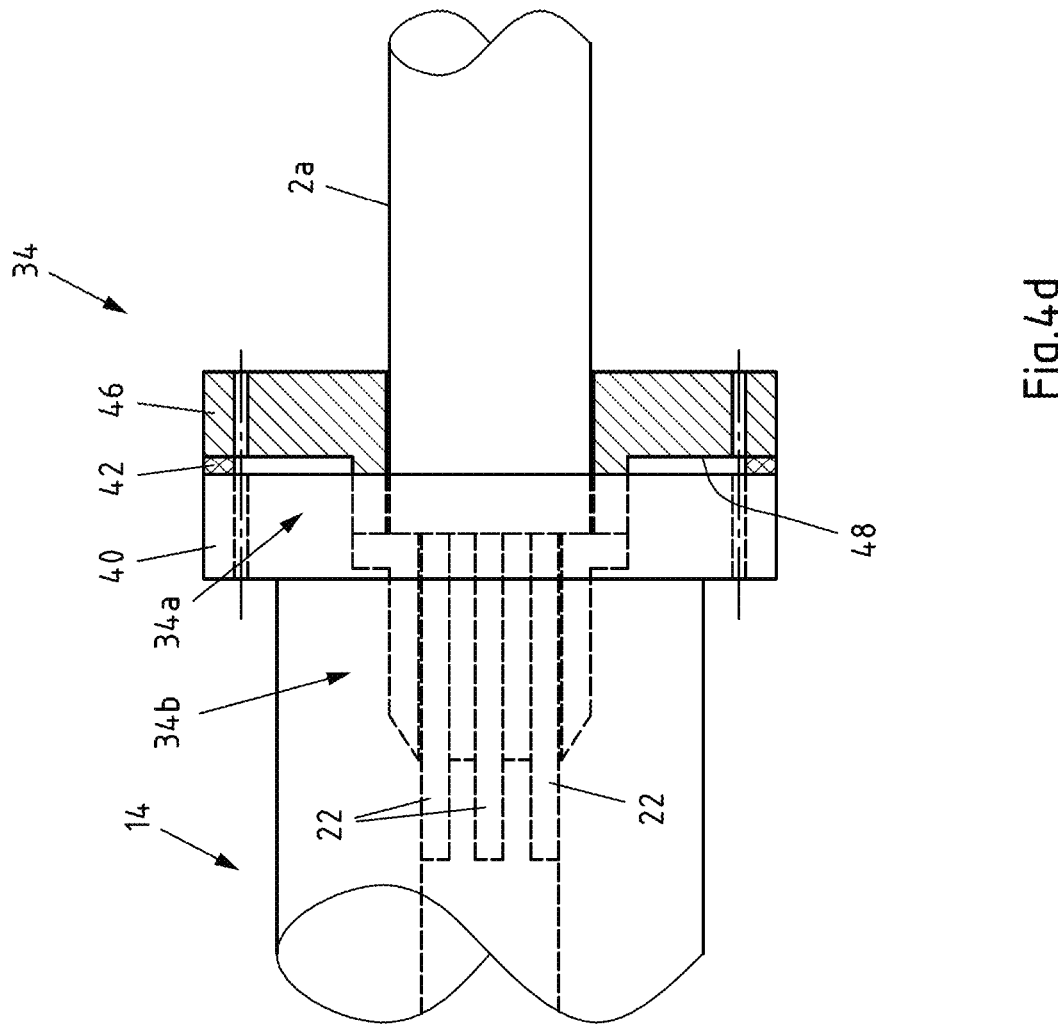

The energy lines 22 are received in the second part 34b in the form of a sleeve and are led out there in a preferably sealed manner. The transition piece 34 thus assembled can be inserted into the cable duct 14 as shown in FIG. 4c and FIG. 4d. For this purpose, the second section 2b with the energy lines 22 is drawn into the cable duct 14. In the process, the second part 34b is also inserted into the cable duct 14. The flange 46 of the first part 34a comes into contact with the flange 40, and a seal 42 may be provided. The flange 40 is screwed to the flange 46. In the joined state, the cable 2 now lies with its first section 2a substantially outside the cable duct 14 and extends with its second section 2b inside the cable duct 14.

Support for the amendments may be found in the Originally filed Specification, claims and drawings. No new matter is added by way of the foregoing Specification amendments.

With the aid of the present submarine cable system, it is possible to increase the current carrying capacity of submarine cables when laid underground in HDD. At the same time, a submarine cable can be laid continuously subsea/ underground as well as underground in the HDD without temperature problems. Thermal losses due to eddy currents in reinforcements are reduced.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

2 Submarine cable system
4 Substation
6 Seabed
8 Connection bracket
10 Water surface
12 Transfer point
14 Cable duct
16 Nozzle
18 Onshore Station or Transition Joint Bay (TJB)
20 Connection bracket
22a, b Energy line
24a, b Stranded wire
26a, b Insulation layer
28 Spacer
30 Reinforcement
32 Insulation
34 Transition piece
34a, b Part
36a, b Through hole
38 Face
40 Flange
42 Gasket
44 Spacer
46 Flange
48 Face

The invention claimed is:
1. Submarine cable system comprising:
a submarine cable with at least two energy lines guided between two distal ends of the submarine cable, wherein
each respective energy line comprises a stranded wire, and at least one insulation layer surrounding the stranded wire, and
the two energy lines are guided in a common metallic reinforcement and an outer insulation layer surrounding the metallic reinforcement, and wherein
a first section of the submarine cable is formed starting from a first of the distal ends of the submarine cable up to a transition region, wherein in the first section the energy lines are guided in the metallic reinforcement and the outer insulation layer surrounding the metallic reinforcement, and
a second section of the submarine cable is formed starting from the transition region up to a second of the distal ends of the submarine cable, wherein in the second section the energy lines are free of the metallic reinforcement and the outer insulation layer surrounding the metallic reinforcement,
a sleeve-shaped transition piece having a through opening, wherein the transition region is disposed within the through opening, wherein a cable duct is provided, wherein at a first end of the cable duct an opening of the cable duct is formed to receive the transition piece such that an outer shell surface of the transition piece abuts an inner shell surface of the cable duct in the region of the opening; and wherein at a second end of the cable duct, opposite the first end, the cable duct is configured to provide connection to a connection bracket of an onshore station or transition joint bay.

2. Submarine cable system of claim 1, wherein the transition piece has a flange-like radial projection.

3. Submarine cable system of claim 2, wherein the flange-like projection abuts against an end face of the cable duct.

4. Submarine cable system of claim 1, wherein the transition piece is formed in two parts, the two parts being attached to one another by a respective projection.

5. Submarine cable system of claim 1, wherein an outer lateral surface of the transition piece is fixed to an inner lateral surface of the cable duct in a force-locking and/or form-locking manner.

6. Submarine cable system of claim 5, wherein radial projections on the outer lateral surface of the transition piece engage in radial recesses on the inner lateral surface of the cable duct.

7. Submarine cable system of claim 1, wherein the reinforcement is fastened to the transition piece in a force-fitting and/or form-fitting manner.

8. Submarine cable system of claim 7, wherein the force-fitting and/or form-fitting manner is a clamping manner.

9. Submarine cable system of claim 1, wherein the submarine cable is guided with its first section starting from an offshore station to the transition piece, is guided through the transition piece into the cable duct and is guided with its second section within the cable duct underground to the onshore station/transition joint bay (TJB).

10. Submarine cable system of claim 1, wherein the cable duct is at least partially a horizontal bore duct.

11. Submarine cable system comprising:

a submarine cable with at least two energy lines guided between two distal ends of the submarine cable, wherein each respective energy line comprises a stranded wire, and at least one insulation layer surrounding the stranded wire, and the two energy lines are guided in a common metallic reinforcement and an outer insulation layer surrounding the metallic reinforcement, and wherein a first section of the submarine cable is formed starting from a first of the distal ends of the submarine cable up to a transition region, wherein in the first section the energy lines are guided in the metallic reinforcement and the outer insulation layer surrounding the metallic reinforcement, and a second section of the submarine cable is formed starting from the transition region up to a second of the distal ends of the submarine cable, wherein in the second section the energy lines are free of the metallic reinforcement and the outer insulation layer surrounding the metallic reinforcement, a sleeve-shaped transition piece having a through opening, wherein the transition region is disposed within the through opening, wherein a cable duct is provided, wherein an opening of the cable duct is formed to receive the transition piece such that an outer shell surface of the transition piece abuts an inner shell surface of the cable duct in the region of the opening;

wherein the transition piece is formed in two parts, the two parts being attached to one another by a respective projection, wherein the first part of the transition piece extends towards the first section of the submarine cable, and that the second part of the transition piece extends towards the second section of the submarine cable.

12. Method of laying a submarine cable system comprising:

a submarine cable system comprising:

a submarine cable with at least two energy lines guided between two distal ends of the submarine cable, wherein each respective energy line comprises a stranded wire, and at least one insulation layer surrounding the stranded wire, and the two energy lines are guided in a common metallic reinforcement and an outer insulation layer surrounding the metallic reinforcement, and wherein a first section of the submarine cable is formed starting from a first of the distal ends of the submarine cable up to a transition region, wherein in the first section the energy lines are guided in the metallic reinforcement and the outer insulation layer surrounding the metallic reinforcement, and a second section of the submarine cable is formed starting from the transition region up to a second of the distal ends of the submarine cable, wherein in the second section the energy lines are free of the metallic reinforcement and the outer insulation layer surrounding the metallic reinforcement, a sleeve-shaped transition piece having a through opening, wherein the transition region is disposed within the through opening, wherein a cable duct is provided, wherein an opening of the cable duct is formed to receive the transition piece such that an outer shell surface of the transition piece abuts an inner shell surface of the cable duct in the region of the opening, wherein the submarine cable is assembled onshore with the first and second sections, the first section is mechanically and electrically connected to an offshore station, the submarine cable with the transition region is inserted into the through opening of the transition piece, the reinforcement of the submarine cable is mechanically fixed to the transition piece, and the submarine cable with the second section is guided starting from the transition piece at least partially through the buried cable duct towards an onshore station/transition joint bay (TJB).

13. Method of claim 12, wherein the submarine cable is inserted onshore with the transition section into the through-opening of the transition piece and meanwhile the reinforcement of the submarine cable is mechanically fixed onshore to the transition piece.

\* \* \* \* \*